Patented Jan. 6, 1925.

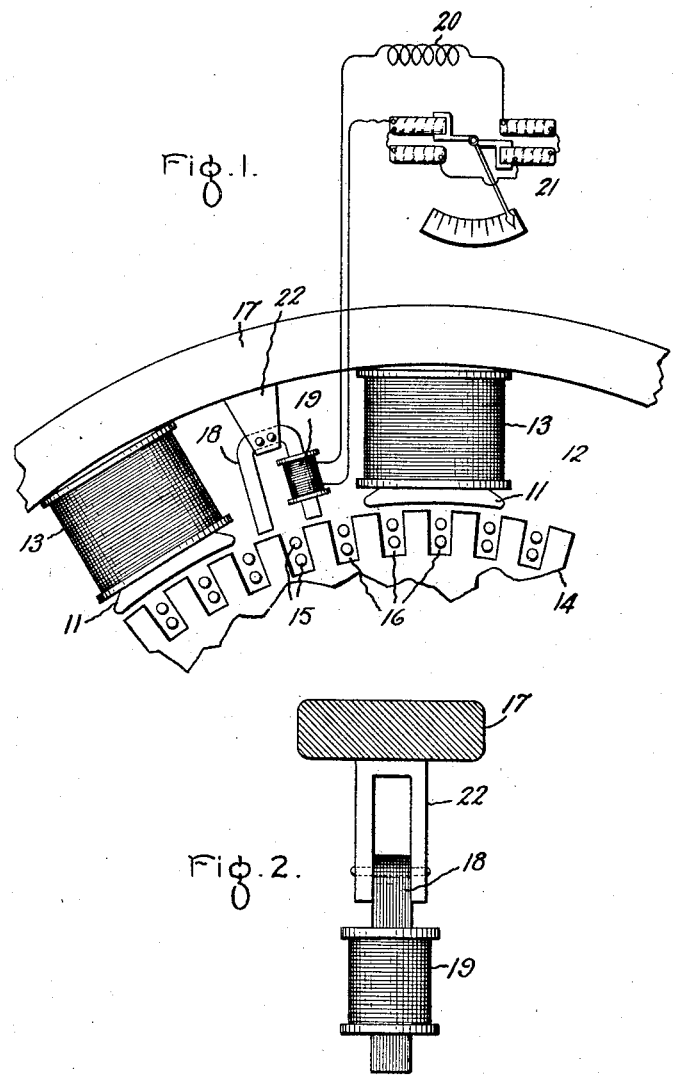

1,522,196

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

CURRENT INDICATOR.

Application filed March 1, 1921. Serial No. 448,930.

*To all whom it may concern:*

Be it known that I, CAMPBELL MACMILLAN, a citizen of the United States, residing at Schenectady, in the county of Schenectady, State of New York, have invented certain new and useful Improvements in Current Indicators, of which the following is a specification.

This invention relates to a current indicator, and more particularly to such an indicator especially adapted for use in circuits where it is impracticable to connect an ordinary ammeter into the circuit to measure the current flow.

One instance in which such a condition may arise is that of a motor driven from a generator, both machines being located near each other and the rotor conductors of the generator being directly connected to the rotor conductors of the motor, the machines rotating in synchronism. Such an installation has been used for example, in a ship propulsion system, where an induction generator and a synchronous motor were thus connected, and formed a clutch. The rotor bars of the induction generator were immediately connected to the armature conductors of the synchronous motor. No collector rings could be used, and thus there was no opportunity for the insertion of an instrument to measure the current flowing in the armature conductors.

My present invention renders the measurement of the current possible by the generation of an electromotive force due to pulsation of a magnetic flux set up by the armature conductors, this electromotive force serving to actuate an indicating instrument. The ordinary ammeter is thus obviated, and it is not necessary to interrupt the armature circuit.

For a better understanding of my invention, reference is to be had to the specification together with the accompanying drawings, in which Figure 1 is a diagrammatic view showing how my invention may be applied to a dynamo electric machine having stationary field poles and a revolving armature; and Fig. 2 is a cross section of a portion of the dynamo electric machine showing how some of the elements of my device are supported.

Referring now more in detail to the drawings in which like reference characters refer to like parts throughout, I represent the stationary field poles 11 of the dynamo electric machine 12 as being excited by direct current coils 13. A fragmentary portion of the armature 14 is also shown. The conductors 15 in the armature are embodied in slots 16.

By means of the strap 22, I support from the magnetic frame 17 of the dynamo electric machine a U-shaped magnetic member 18 so arranged that it is in inductive relations with the armature 14. The legs of the magnetic member 18 have a spread substantially equal to the pitch of the slots 16, and the member is preferably made of laminated material so as to reduce the eddy current losses. Located somewhere upon this magnetic member 18 is a coil 19 connected in series with a reactance coil 20. An indicating instrument of the dynamometer type 21 is included in the circuit with the coils 19 and 20. The magnetic member 18 thus completes a magnetic path for a short length of one rotor slot around the conductors in that slot.

As the armature 14 rotates there is a variation in the magnetic flux threading this magnetic member 18, due to the succession of slots and teeth. There is thus an alternating voltage induced in the coil 19 which is measured by the instrument 21. The rotor bars or conductors 15 of the armature 14 carry current which is virtually stationary in space relative to the direct current field. Since its magnitude determines the maximum flux in the magnetic member 18, it constitutes the excitation current for the inductor alternator action described above. The amount indicated by the instrument 21 is a function of the voltage induced in coil 19, divided by the impedance of the complete instrument circuit. The voltage induced in the coil 19 by the inductor action varies directly as the current in the conductors 15 and directly as the tooth frequency, or as the speed of the armature. The impedance of the instrument circuit due to the insertion of coil 20 consists almost entirely of reactance which is also directly dependent upon the tooth frequency. Thus the effect of the tooth frequencies is eliminated and the reading is proportional only to the rotor current flow. This device is thus adapted to measure the current in the armature conductors by purely inductive action and the measurement is rendered free from errors due to variations in speed of the armature. This device thus obviates the necessity of the introduction of an instrument in the circuit of the armature conductors.

While I have shown in the accompanying drawings but one embodiment of my invention, I do not wish to be limited thereto but aim to embrace in the appended claims all modifications falling fairly within the scope of my invention.

What I claim as new and desire to secure by Letters Patent of the United States, is:—

1. Means for measuring the current normally flowing in the armature windings of a dynamo electric machine, comprising a member of magnetic material placed in inductive relation to the armature core, said member and armature being relatively rotatable, a coil mounted on said member, a reactance coil placed in series therewith, and an instrument responsive solely to the current flowing in this circuit.

2. Means for measuring the current normally flowing in the armature windings of a dynamo electric machine provided with direct current excited magnet poles and a relatively rotatable armature, comprising a member of magnetic material in fixed relation to the poles, and in inductive relation to the armature core, a coil mounted on said member, a reactance coil placed in series therewith, and an instrument responsive solely to the current flowing in this circuit.

3. Means for measuring the current flowing in the armature windings of a dynamo electric machine, comprising a U-shaped member of magnetic material placed in inductive relation to the armature, the legs of the member having a spread substantially equal to the pitch of a slot on the armature, and a coil mounted on said member.

4. Means for measuring the current flowing in the armature windings of a dynamo electric machine provided with direct current excited magnet poles and a relatively rotatable armature, comprising a U-shaped member of magnetic material placed in inductive relation to the armature core, the legs of the member having a spread substantially equal to the pitch of a slot on the armature, the member being placed in fixed relation to the poles, and a coil mounted on said member.

5. Means for measuring the current flowing in the armature windings of a dynamo electric machine, comprising a U-shaped member of magnetic material placed in inductive relation to the armature, the legs of the member having a spread substantially equal to the pitch of a slot on the armature, a coil mounted on said member, a reactance coil placed in series therewith, and an instrument responsive to the current flowing through this circuit.

6. Means for measuring the current flowing in the armature windings of a dynamo electric machine provided with direct current excited magnet poles and a relatively rotatable armature, comprising a U-shaped member of magnetic material placed in inductive relation to the armature core, the legs of the member having a spread substantially equal to the pitch of a slot on the armature, the member being placed in fixed relation to the poles, a coil mounted on said member, a reactance coil placed in series therewith, and an instrument responsive to the current flowing in this circuit.

In witness whereof, I have hereunto set my hand this 28th day of February, 1921.

CAMPBELL MACMILLAN.